US006794320B1

(12) United States Patent
Parkhill et al.

(10) Patent No.: US 6,794,320 B1
(45) Date of Patent: Sep. 21, 2004

(54) DIRECTION IN LOW-TEMPERATURE PASTE DEVELOPMENT

(75) Inventors: Robert L. Parkhill, Stillwater, OK (US); Edward T. Knobbe, Stillwater, OK (US)

(73) Assignees: Sciperio, Inc., Stillwater, OK (US); Oklahoma State University, Stillwater, OK (US)

( * ) Notice: Subject to any disclaimer, the term of this patent is extended or adjusted under 35 U.S.C. 154(b) by 0 days.

(21) Appl. No.: 10/024,453

(22) Filed: Dec. 17, 2001

Related U.S. Application Data
(60) Provisional application No. 60/255,405, filed on Dec. 15, 2000.

(51) Int. Cl.[7] .............................. C03C 8/16; C03C 8/14
(52) U.S. Cl. ........................................... 501/20; 501/17
(58) Field of Search ............................... 501/14–23, 32

(56) References Cited

U.S. PATENT DOCUMENTS

| | | | | |
|---|---|---|---|---|
| 4,260,406 A | * | 4/1981 | Corbett et al. ................. | 65/43 |
| 4,977,547 A | | 12/1990 | Giniewicz et al. | |
| 5,137,848 A | * | 8/1992 | Barker et al. .................. | 501/18 |
| 5,173,457 A | * | 12/1992 | Shorthouse ................... | 501/65 |
| 5,312,674 A | * | 5/1994 | Haertling et al. ........... | 428/210 |
| 5,814,571 A | * | 9/1998 | Kawakami et al. ........... | 501/20 |
| 5,958,597 A | | 9/1999 | Yamana | |
| 6,132,649 A | | 10/2000 | Cauda et al. | |
| 6,191,523 B1 | | 2/2001 | Kahn et al. | |
| 6,399,230 B1 | * | 6/2002 | Tormey et al. .............. | 428/702 |
| 6,439,943 B1 | * | 8/2002 | Aoki et al. .................... | 445/24 |

FOREIGN PATENT DOCUMENTS

| | | | | |
|---|---|---|---|---|
| DE | 10203958 A1 | * | 8/2002 | ............ C09D/1/02 |

OTHER PUBLICATIONS

Derwent Abstract 2003–048047, Abstract of DE 102 03 958 A1.*
Arkles, "Commercial Applications of Sol–Gel–Derived Hybrid Materials," *MRS Bulletin* 402–407 (2001).
Barrow et al., "Thick Ceramic Coatings Using a Sol–Gel Based Ceramic–Ceramic 0–3 Composite," *Surface & Coatings Technology* 76(1–3):113–118 (1995).
Barrow et al., "In–Line Phase Modulators Using Coaxial Thick Lead Zirconate Titanate Coated Optical Fibers," *J. Appl. Phys.* 79(6):3323–3329 (1996).
Barrow et al., "Characterization of Thick Lead Zirconate Titanate Films Fabricated Using a New Sol–Gel Based Process," *J. Appl. Phys.* 81(2):876–881 (1997).
Chen et al., "Lithium Tantalate/Lead Zirconate Titanate Composite Ultrasonic Transducers," Appl. Phys. Letters, 74(17):2552–2554 (1999).
Cheung et al., "Characterization of Barium Titanate Ceramic/Nanocomposite Films Prepared by a Sol–Gel Process," *Nanostructured Materials* 11(7):837–844 (1999).
McIntyre et al., "Electrical Characterization of PZT on Rapid Thermally Annealed Ruthenium Oxide Electrodes," *Integrated Ferroelectrics* 10(1–4):301–308 (1995).
Publication on Kia corporation website entitled Kia Sealants url:kemcointernational.com.
Publication on Viox corporation website entitled Producers of Electronic Glass Frit and Powers url: www.viox.com.
Publication on Kia corporation website entitled Frit Glass, Powders and Sealants url:www.kemcointernational.com.
Publication on Kia corporation website entitled Table 2—Applications: Crystallizing Glasses url:www.kemcointernational.com.
Publication on Kia corporation website entitled Table 1—Typical Properties Sealable to Materials: Sealing Glass Reference Guide url: www.kemcointernational.com.
Publication on Kia corporation website entitled 89 Expansion Systems url : www.kemcointernational.com.
Publication on Kia corporation website entitled 46 Expansion Systems url:www.kemcointernational.com.
Publication on Kia corporation website entitled 72 Expansion Systems url: www.kemcointernational.com.
Publication on Kia corporation website entitled 85 Expansion Systems url: www.kemcointernational.com.
Sayer et al., "Functional Ceramic Films and Coatings: Linking Chemistry and Innovation," *Canadian Ceramics Quarterly—J. Canada Ceram. Soc.* 65(2):124–130 (1996).
Sedlar et al., "Characterization of Doped BST Thin Films Prepared by a Modified Sol–Gel Method," *Integrated Ferroelectrics* 10(1–4):113–121 (1995).
Sedlar et al., "Structural and Electrical Properties of Ferroelectric Bismuth Titanate Thin Films Prepared by the Sol–Gel Method," *Ceram. Intl.* 22(3):241–247 (1996).
Sedlar et al., "Sol–Gel Processing and Properties of Cerium Doped Barium Strontium Titanate Thin–Films," *J. Sol–Gel Sci. Tech.* 5(3):201–210 (1995).
Yi et al., "An Acetic Acid Water–Based Sol–Gel PZT Process I. Modification of Zr and Ti Alkoxides with Acetic Acid," *J. of Sol–Gel Sci. Tech.* 6(1):65–74 (1996).
Yi et al., "An Acetic Acid Water–Based Sol–Gel PZT Process II. Formation of a Water–Based Solution," *J. of Sol–Gel Sci. Tech.* 6(1):75–82 (1996).

* cited by examiner

*Primary Examiner*—Karl Group
*Assistant Examiner*—Elizabeth A. Bolden
(74) *Attorney, Agent, or Firm*—Needle & Rosenberg, P.C.

(57) ABSTRACT

Paste compositions for forming ceramic composites can include at least one solvent; at least one optional binder; at least one low-temperature frit glass; and a plurality of one or more functional particles; wherein the paste is capable of forming a composite upon low-temperature processing or laser processing.

16 Claims, No Drawings

DIRECTION IN LOW-TEMPERATURE PASTE DEVELOPMENT

CROSS REFERENCE TO RELATED APPLICATIONS

This application claims the benefit of United States Provisional Application Ser. No. 60/255,405; filed Dec. 15, 2000, which application is hereby incorporated by reference in its entirety for all purposes.

FIELD OF THE INVENTION

This invention relates generally to ceramic composite materials comprising particles present in a matrix as well as paste compositions that are capable of forming such ceramic composite materials.

BACKGROUND OF THE INVENTION

In recent years, several development efforts have been made to find more viable and cost effective methods for obtaining solid-state materials.

For example, U.S. application Ser. No. 09/777,965, which is incorporated by reference in its entirety for all purposes, relates to the use of a sol-gel process in the formation of ceramic-containing materials. The inventive process provide a low-temperature route for preparing ceramic materials including "0-3 composites" having excellent homogeneity, a low sintering temperature, low impurity levels and customizable physical features.

However, these initial efforts to provide low temperature processing of "0-3 composite" materials also faced certain processing issues such as solvent loss, matrix precursor decomposition, process control of in situ nanoparticle formation, particle dispersion, rheology, viscosity, and dispensability.

Therefore, a need still exists for a method of obtaining a paste that can subsequently be processed by low temperature and/or laser processing methods to provide solid-state materials with improved overall performance.

SUMMARY OF THE INVENTION

Among other aspects, this invention relates to ceramic composite materials as well as paste compositions for forming ceramic composites that can be directly written or otherwise deposited by miniaturized pens and subsequently processed into solid-state materials.

For example, the invention includes paste compositions that are comprised of a solvent, low temperature frit glass, alone or together with one or more optional binders (e.g., sol-gel precursors), and one or more functional particles. After processing, the final solid-state material comprises a particulate phase comprised of the one or more functional particle, and a new single-phase matrix comprised of low-temperature frit glass.

Accordingly, in a first aspect, the present invention provides a paste composition for forming a ceramic composite comprising: (a) at least one solvent; (b) at least one optional binder; (c) at least one low-temperature frit glass; and (d) a plurality of one or more functional particles, wherein the paste is capable of forming a composite upon low-temperature processing or laser processing.

In a second aspect, the invention provides a method for providing improved matrix consolidation of a 0-3 composite wherein the method comprises: (a) providing a paste composition suitable for forming a 0-3 composite, said paste including a low-temperature frit glass; and (b) subjecting the paste composition to conditions effective to provide a composite.

In a third aspect, the present invention provides a "0-3 composite" ceramic element comprising: (a) a functional particle; and (b) a single-phase ceramic matrix, wherein the ceramic matrix is comprised of an optional sol-gel precursor and a low-temperature frit glass.

In still another aspect, the present invention provides a composite material comprising: (a) a particulate phase comprising a plurality of one or more functional particles; and (b) a single-phase ceramic matrix phase comprising at least one low-temperature frit glass; wherein the particulate phase: (i) is at least substantially entrapped within the ceramic phase, and (ii) exhibits limited or no inter-particle connectivity.

Furthermore, in still another aspect, the present invention provides a method for making a ceramic material including the laser processing of a sol-gel precursor, wherein the improvement comprises the inclusion of a low-temperature glass with the sol-gel precursor.

Additional advantages and embodiments of the invention will be obvious from the description, or may be learned by practice of the invention. Further advantages of the invention will also be realized and attained by means of the elements and combinations particularly pointed out in the appended claims. Thus, it is to be understood that both the foregoing general description and the following detailed description are exemplary and explanatory of certain embodiments of the invention and are not restrictive of the invention as claimed.

DETAILED DESCRIPTION

The present invention may be understood more readily by reference to the following detailed description and any examples provided herein. It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Ranges may be expressed herein as from "about" or "approximately" one particular value and/or to "about" or "approximately" another particular value. When such a range is expressed, another embodiment comprises from the one particular value and/or to the other particular value. Similarly, when values are expressed as approximations, by use of the antecedent "about" or "approximately", it will be understood that the particular value forms another embodiment.

Throughout this application, where publications are referenced, the disclosures of these publications in their entireties are hereby incorporated by reference into this application in their entirety for all purposes, including but not limited to, more fully describe the state of the art to which this invention pertains.

In this specification and the appended claims that follow, reference will be made to a number of terms that shall be defined to have the following meanings:

As used in the specification and concluding claims, the term "residue" refers to the moiety that is the resulting product of the chemical species in a particular reaction scheme or subsequent formulation or chemical product, regardless of whether the moiety is actually obtained from the chemical species. Thus, for example, an ethoxy residue in a sol-gel precursor refers to one or more $CH_3CH_2O-$ units in the sol-gel precursor, regardless of whether the ethoxy moiety is used to prepare the sol-gel precursor.

As used herein, references in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

Furthermore, it should also be understood that as used herein, a weight percent of a component, unless specifically stated to the contrary, is based on the total weight of the formulation or composition in which the component is included.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, cicosyl, tetracosyl and the like. Preferred alkyl groups herein contain from 1 to 12 carbon atoms. The term "lower alkyl" intends an alkyl group of from one to six carbon atoms, preferably from one to four carbon atoms. The term "cycloalkyl" intends a cyclic alkyl group of from three to eight, preferably five or six carbon atoms.

The term "metal alkoxide" as used herein refers an alkyl group bound through a single, terminal ether linkage to a metal. That is, a "metal alkoxide" group may be defined as M-OR where R is an alkyl as defined above and M is a metal, such as aluminum, lead, zirconium, titanium, silicon, iron and the like.

The term "optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

As used herein, by use of the term "effective amount" of a compound or property, it is meant such amount as is capable of performing the function of the compound or property for which an effective amount is expressed. As will be pointed out below, the exact amount required will vary from process to process, depending on recognized variables such as the compounds employed and the processing conditions observed. Thus, it is not always possible to specify an exact "effective amount." However, an appropriate effective amount will be readily determined by one of ordinary skill in the art using only routine experimentation.

As previously indicated, one aspect of the present invention relates to a ceramic composite material comprising particles present in a matrix as well as paste compositions that are capable of forming such ceramic composite materials.

More specifically, the pastes are advantageously capable of being processed by conventional low-temperature methods or by laser processing methods to thereby produce a solid-state material. Accordingly, the pastes can first be directly written or otherwise deposited on to various low temperature substrates, such as plastics, and then subsequently processed without inflicting heat related damage to the low-temperature substrate.

In a first embodiment, the present invention provides a paste composition for forming a ceramic composite comprising at least one solvent, a low-temperature frit glass alone or together with one or more optional binders, and at least one functional particle, wherein the paste is capable of forming a composite upon conventional low temperature processing or upon laser processing methods.

The solvent component comprises one or more solvents effective for, among other aspects, dissolving and/or dispersing the one or more functional particles within the paste composition. As such, the solvent component will facilitate a homogeneous, or substantially homogeneous disbursement of the one or more functional particles throughout the resulting ceramic matrix.

To this end, a suitable solvent for use in the paste composition set forth above will preferably have a relatively low vapor pressure and relatively low boiling point such that the solvent is capable of providing relatively long term stability. Additionally, a solvent exhibiting these desired properties will also advantageously provide for relatively lower temperature removal of the solvent from the paste compositions during subsequent processing of the paste composition.

Specific examples of suitable solvents for use in the present invention include terpineol; dimethyl acetimide; ethylene glycol; glyme based solvent; alkanol having the general formula R-OH, wherein R represents an alkyl substituent as previously defined herein; butyl acetate; mixtures thereof and the like. In a preferred embodiment, the paste composition comprises terpineol and/or a glyme based solvent.

As used herein, the term "binder" intends to refer to an optional component of the paste composition that, upon processing, is capable of forming a ceramic matrix having 3 dimensional connectivity. That is to say that the binder is an optional ceramic matrix precursor.

In addition to forming a ceramic matrix upon processing, the binder may also be capable of acting as an adhesive to temporarily bind the matrix together prior to processing.

In still another property, the binder can act as a quenching agent during a subsequent processing.

Accordingly, the binder particles, where used, are present in amounts sufficient to provide a matrix having the desired properties set forth herein. Specific examples can include, without limitation, compositions wherein the binder is present in an amount effective to provide a final matrix comprising wherein the binder is present in an amount of from approximately 0, 1, 5, 10, 15, or even 20 percent by volume of the final composite to approximately 5, 10, 15, 20, 25, 30 or 35 percent by volume of the final composite. To this end, it should be understood that suitable ranges include those ranges where any one of the lower end percentages is paired with any one of the upper end percentages.

In an exemplary embodiment, the binder is one or more sol-gel precursors. As used herein, a sol-gel precursor refers to any organometallic compound that can participate in a sol-gel inorganic polymerization process ("sol-gel chemistry" as used herein) to thereby form a single-phase ceramic matrix having three-dimensional connectivity.

To this end, one of ordinary skill in the art will appreciate that "sol-gel chemistry" refers to the concept of a system comprising a liquid phase, typically comprised of a reactive metal alkoxide, wherein the metal alkoxide is chemically converted into a organometallic metal oxide monomer upon exposure to water, i.e., upon hydrolysis. The metal oxide monomer is subsequently capable of participating in an inorganic polymerization process to thereby produce a single phase matrix preferably having three-dimensional connectivity.

In one embodiment, the sol-gel precursor is incorporated into the paste composition as a molecular precursor because of the increased surface area associated with the molecular precursor. To this end, the increased surface area provides a greater number of active sites for interaction with one or more functional particles and/or the low temperature frit glass component during the processing phase. Therefore, it should be understood that by incorporating one or more functional particles and/or the low temperature frit glass into the paste composition before or during the onset of polymerization, the sol-gel process could advantageously enable the entrapment of functional particles within the resulting ceramic matrix.

Typical sol-gel precursors suitable for use in the present invention include, with out limitation, the class of metal alkoxides as previously defined herein. More specifically, the metal alkoxide sol-gel precursor is typically an organo-metallic molecular precursor and/or monomer having the general formula M-OR, $M(OR)_4$, $R'-M(OR)_3$, or $R'R''-M(OR)_2$, wherein R, R' and R'' represent a suitable organic and/or inorganic substituent and M represents a suitable metal. According to the invention, substituents R, R' and R'' can be an alkyl substituent, as previously defined herein, a phenyl substituent; acetoxy; ethoxyethoxy; pentanedionate; halogen, such as chlorine, fluorine or bromine; sodium; potassium, hydrogen, mixtures thereof and the like.

To this end, the metal component "M" can comprise, without limitation, such metals as Silicon (Si), Aluminum (Al), Titanium (Ti), Barium (Ba), Lead (Pb), Zirconium (Zr), and the like and mixtures there of.

The sol-gel precursors, where employed, are present in an amount effective to provide the above-discussed properties. Specific examples of suitable amounts include paste compositions wherein the sol-gel precursor is present in an amount effective to provide a final composite matrix wherein the sol-gel precursor is from approximately 1, 5, 10, 15, or even 20 percent by volume of the final matrix to approximately 5, 10, 15, 20 or even 25 percent by volume of the final composite matrix. To this end, it should be understood that suitable ranges include those ranges where any one of the lower end percentages is paired with any one of the upper end percentages.

As indicated above, the present invention also includes the use of low-temperature frit glass in the composition.

In one embodiment, one or more types of low-temperature frit glass can be used in combination with the optional binder, e.g., a sol-gel precursor. In accordance with this embodiment, the sol-gel precursor is capable of creating a microporous network of ceramic that can interact with the low-temperature frit glass upon processing. During the processing of the paste, heating of the low-temperature frit glass component results in a glass melt that is capable of filing voids and initiating consolidation of the ceramic matrix.

In an alternative embodiment, the paste composition of the present invention does not comprise the optional binder, e.g., a sol-gel precursor. As such, in accordance with this embodiment, the low-temperature frit glass is also capable of providing a suitable ceramic matrix having three-dimensional connectivity, irrespective of the presence of the sol-gel precursor.

In accordance with these embodiments and others that will become apparent to one of ordinary skill in the art, a low-temperature flit glass suitable for use in the paste composition of the present invention, is that which is capable of melting upon exposure to conventional low-temperature processing methods, e.g., sintering, or when exposed to laser processing methods.

To this end, suitable examples include, without limitation, frit glass materials having a substantial content of Boron, e.g., Boric Acid ($B_2O_3$), Zinc, e.g., Zinc Oxide (ZnO), Silicon, e.g., Silicon Dioxide ($SiO_2$) Barium, e.g., Barium oxide (BaO), Zirconium, e.g., Zirconium Oxide (ZrO), Aluminum, e.g., $Al_2O_3$, Lead, e.g., Lead Oxide (PbO), Potassium, e.g., Potassium Oxide ($K_2O$), Sodium, e.g., Sodium Oxide ($Na_2O$), mixtures thereof and the like. In a preferred embodiment, the frit glass component comprises a substantially high lead (PbO) content.

The low-temperature frit glass is present in amounts sufficient to provide a matrix having the desired properties set forth herein. For example, suitable amounts of the low-temperature frit glass are those amounts effective to provide a final matrix composition wherein the frit glass is present in an amount of from approximately 10, 15, 20, 25, or even 30 percent by volume of the final matrix composition to approximately 15, 20, 25, 30, 35, or even 40 percent by volume of the final matrix composition. To this end, it should be understood that suitable ranges include those ranges where any one of the lower end percentages is paired with any one of the upper end percentages. In one embodiment, the preferred amounts of low-temperature frit glass particles in the final matrix is between 20 to 40 volume percent of the final matrix composition.

As stated above, paste composition(s) according to the present invention farther comprise one or more functional particles.

To this end, the one or more functional particle will in large part depend upon the desired end use for the paste composition. Therefore, it is within the scope of the present invention for the functional particle to comprise a filler, a secondary particle and/or molecular precursor, a frit glass modifier, a component suitable to provide a desired electronic component, mixtures thereof and the like.

It is envisioned that the present invention will be particularly useful in the manufacture of electronic components such as resistors, capacitors, inductors and the like. Therefore, the functional particle, as well as the amounts thereof, can be chosen to provide the necessary properties required by the desired electronic component.

To this end, a functional particle suitable for use in resistor components will be a material that is capable of providing variable conductivity. Therefore, in one embodiment, the functional particle comprises graphite. In an alternative preferred embodiment, the functional particle comprises a ruthenium-based resistor material, such as ruthenium oxide ($Ru_2O_3$) or strontium ruthenium oxide ($SrRuO_3$).

In these embodiments the amount of functional particle can vary greatly depending on the desired properties of the resulting components. Specific examples can include, without limitation, compositions comprising functional particles present in an amount of from approximately 1, 5, 10, 15, or 20 percent by volume to approximately 5, 10, 15, 20, 25, 30 or 35 percent by volume. To this end, it should be understood that suitable ranges include those ranges where any one of the lower end percentages paired with any one of the upper end percentages. Additionally, one will also appreciate that lower volume fractions will result in high resistances where as higher volume fractions will result in lower resistances.

In another embodiment, the functional particle is a material suitable for use in a capacitor. Therefore, in accordance with this embodiment, a suitable functional particle is a dielectric that is capable of providing insulation for capacitance. Specific examples of such particles include, without limitation, $SiO_2$, $TiO_2$, $Al_2O_3$, $BaTiO_3$, or other oxide based ceramic materials.

In these embodiments the amount of functional particles can vary greatly depending on the desired properties of the resulting components. Typically, suitable amounts of the functional particle are those amounts effective to provide a final matrix composition wherein the functional particle is present in an amount of from approximately 25, 35, 45, 55, or even 65 percent by volume of the final matrix composition to approximately 35, 45, 55, 65 or even 75 percent by volume of the final matrix composition. To this end, it should be understood that suitable ranges include those ranges where any one of the lower end percentages is paired with any one of the upper end percentages.

As indicated above, in still another embodiment, the functional particle may be one or more particles capable of providing inductance such that the particle is effective for use in an inductor component. To this end, the functional particle is preferably a ferromagnetic material, such as manganese zinc ferrite, ytterium iron garnet or other oxide based ferrite materials exhibiting magnetic properties. Typical low frequency inductors are comprised of manganese zinc ferrites, where as high frequency inductors are typically comprised of ytterium iron garnets.

In these embodiments the amount of functional particles can vary greatly depending on the desired properties of the resulting components. Typically, suitable amounts of the functional particle are those amounts effective to provide a final matrix composition wherein the functional particle is present in an amount of from approximately 25, 35, 45, 55, or even 65 percent by volume of the final matrix composition to approximately 35, 45, 55, 65 or even 75 percent by volume of the final matrix composition. To this end, it should be understood that suitable ranges include those ranges where any one of the lower end percentages is paired with any one of the upper end percentages.

The functional particle can also be a secondary particle, or molecular precursor that is used in amount sufficient to alter one or more properties of the low-temperature frit glass during processing. For example, in one embodiment, a high-temperature ceramic powder is mixed with the frit glass component in an amount effective to provide mixing between the two components during processing. During processing, the low temperature frit glass will undergo rapid melting of the individual glass particles to form a liquid solution. Once the processing is complete, the liquid glass solution cools and resolidifies into a solid glass or ceramic matrix having the identical properties as the initial powder phase, e.g., melting point, dielectric constant, and thermal expansion constant. The addition of a secondary particle or molecular precursor into the paste composition at or before processing can advantageously modify or alter the physical properties of the frit glass.

For example, a homogenous mixture of a low-temperature glass and a high temperature ceramic powder will alter the composition of the low-temperature glass upon melting. The addition of the high temperature ceramic powder will typically raise the melting point of the low temperature glass. The increase in the melting point during processing will act to quench the melt and thereby providing a solid matrix. The quenching affect can be used to help reduce line deformation and maintain line shape of the written or otherwise deposited paste during processing. Therefore, it will be appreciated that if the conditions are accurately controlled such that the processing temperature exceeds that of the low-temperature flit glass but not that of the resulting composition, the melt will be rapidly quenched, thereby facilitating the formation and consolidation of the ceramic composite matrix.

In accordance with these and other embodiments set forth herein, the molecular precursor, if desired, can be compositionally compatible with the optional sol-gel precursor to the extent that the sol-gel precursor is present within the composition. That is to say, if the paste comprises a sol-gel precursor comprised of silicon based metal alkoxide, it can be, although not required, that the molecular precursor be a chemically compatible silicon based metal alkoxide as well. To that end, the use of a chemically identical binder and secondary particle will yield a homogenous, or at least relatively more homogenous composition capable of producing more stable films and other elements.

In an alternative aspect, the present invention further provides a method for providing a ceramic composite with improved matrix consolidation. In accordance with this aspect of the present invention, the method comprises providing a paste composition as previously described herein and subjecting said paste composition to processing conditions effective to provide a composite material.

In a first embodiment of the method, the processing conditions are preferably relatively low temperature process conditions, such as a sintering process, wherein the conditions are suitable for melting a low-temperature frit glass as defined herein. To this end, one of ordinary skill in the art will appreciate that any conventional low temperature method can be used to process the paste compositions set forth herein and thereby produce a composite material. The processing temperature of such paste will be based on the type of frit glass utilized. A typical processing scenario will include controlled heating to the recommended processing temperature followed by a holding period and controlled temperature descent.

In an alternative embodiment, a suitable processing method comprises a laser processing method. The laser processing method consist of irradiating the composite matrix which rapidly heats the composite passed the low temperature frit glass melting point and leads to matrix consolidation. The laser processing conditions are accurately controlled such that the temperature exceeds that of the low-temperature frit glass but not that of the resulting composite. During the melt, the liquidous glass mixes with the secondary particle thereby quenching the melt and forming a consolidated ceramic composite matrix.

As previously indicated, subjecting the paste composition of the present invention to a suitable processing conditions will initiate the formation and subsequent consolidation of the ceramic matrix. Additionally, said process conditions will also result in the removal of all or substantially all of the solvent present within the paste composition. Therefore, after processing, the resulting ceramic composite will comprise a new single-phase composite matrix and a particulate phase entrapped within the single-phase composite matrix.

To this end, in still another aspect, the present invention further provides a composite material comprising a particulate phase and a single-phase ceramic matrix having three-dimensional connectivity.

In one embodiment, the particulate phase comprises one or more functional particles as defined herein. Furthermore, the one or more functional particles with be entrapped within the single-phase ceramic matrix such that there is limited or substantially no interparticle connectivity between the functional particles. One of ordinary skill in the art will appreciate that this is referred to in the art as a "0-3 composite", wherein the functional particle exhibits a substantially zero degree of inter-particle connectivity and the ceramic matrix exhibits a three dimensional degree of inter-particle connectivity, hence the term "0-3."

It should also be understood that, depending on the components present within the paste composition prior to processing, the resulting single-phase ceramic matrix phase comprises an optional binder, as defined herein, such as a sol-gel precursor, and at least one low temperature-frit glass.

Moreover, the resulting ceramic matrix can take a variety of suitable forms, with a film form being preferred for many environments, e.g., that can be directly written or otherwise deposited by miniaturized pens and subsequently processed into solid-state materials.

Ceramic films that can be formed according to the present invention can be thick films, e.g., films having a thickness as great as 50 microns. In addition, thinner films, e.g., films on the order of 1 micron, or even less, can also be produced. To this end it should be understood that films according to the present invention can be any thickness between approximately 0.1 microns up to approximately 50 microns, including but not limited to films having a thickness of 0.5, 1, 5, 10, 15, 20, 25, 30, 35, 40, or even 45 microns. Furthermore, specific examples of desired film thicknesses include thicknesses effective to provide a commerical microelectric thick film resistor and/or capacitors.

The films according to the present invention can be deposited on a wide variety of substrates including low temperature substrates. Examples of suitable substrates include alumina, quartz, borosilicate glass, kapton, and FR4 epoxy substrates.

Moreover, techniques for forming such films, e.g., screen printing, microdispensing, and the like, on the desired substrate are recognized in the art and need not be described in detail here. Specific examples of suitable techniques include, without limitation, screen printing, microdispensing nozzles, syringe based dispensing.

EXAMPLES

The present invention will now be described in terms of one or more examples thereof. It is to be understood that these examples are illustrative and not limitative in nature.

Example #1

A silicon dioxide based ($SiO_2$) dielectric matrix was prepared from a metal alkoxide precursor using tetramethoxysilane, which is capable of forming $SiO_2$ upon processing, and additional $SiO_2$ powder. First, a suitable paste was prepared by combining 4.92 ml of tetramethoxysilane with 8.0 grams of $SiO_2$ powder. The two components were then mixed together with a 3.25 ml of a diglyme solvent to form a resulting stable paste composition. After depositing the paste onto a low temperature substrate, the paste was dried by heating to 150° C. for 15 minutes. The matrix was then consolidated using either a conventional oven or laser processing method. Using a conventional oven processing technique, the paste was processed at 350° C. for 30 minutes, where as using a laser processing technique required less than a second of localized high intensity irradiation to provide a consolidated ceramic matrix that consists of a pure, or at least substantially pure three dimensional $SiO_2$ network in which approximately 20% by volume of the network was derived from the sol-gel (metal alkoxide) precursor and 80% by volume from the silica powder.

Example #2

A silicon dioxide based ($SiO_2$) composite matrix derived from fritted glass was prepared using a lead based low temperature frit glass powder and $SiO_2$ powder. First, a suitable paste was prepared by combining 19.20 grams of the lead based fritted glass with 14.4 grams of $SiO_2$ powder. The two components were then mixed together 12.25 ml of terpineol solvent to form a stable paste composition. After depositing the paste onto a low temperature substrate, the paste was dried by heating to 150° C. for 15 minutes. The matrix was then consolidated using either a conventional oven or laser processing method. Using a conventional oven processing technique, the paste was processed at 450° C. for 45 minutes (processing temperature solely based on the type of frit glass used), where as using a laser processing technique required less than a second of localized high intensity irradiation to provide the resulting consolidated three dimensional ceramic matrix. It was subsequently determined that the resulting matrix comprised approximately 30 percent by volume of consolidated frit glass network with $SiO_2$ particles dispersed throughout.

While this invention has been described in connection with preferred embodiments, it is not intended to limit the scope of the invention to the particular embodiments set forth, but on the contrary, it is intended to cover such alternatives, modifications, and equivalents as may be included within the spirit and scope of the invention as defined by the appended claims. For example, there are numerous variations and combinations of reaction conditions, e.g., component concentrations, desired solvents, solvent mixtures, temperatures, pressures and other reaction ranges and conditions that can be used to optimize the product purity and yield obtained from the described process. Also, one skilled in the art will appreciate that in practicing the process of this invention, only reasonable and routine experimentation will be required to optimize such process conditions.

What is claimed is:

1. A paste composition for forming a ceramic composite comprising:
   a) at least one solvent;
   b) at least one frit glass; and
   c) at least one functional particle;
   wherein the paste composition is capable of being directly deposited onto a plastic substrate and wherein the at least one frit glass has a melting point low enough that the paste composition is capable of being subsequently processed under conditions effective to provide a composite without inflicting heat related damage to the plastic substrate.

2. The paste composition of claim 1, further comprising d) at least one binder.

3. The paste composition of claim 1, wherein the paste is capable of forming a "0-3 composite" ceramic element.

4. The paste composition of claim 1, wherein the paste is capable of being deposited onto a substrate by a miniaturized pen.

5. The paste composition of claim 1, wherein the solvent is selected from the group consisting of terpineol, dimethyl acetimide, ethylene glycol, a glyme based solvent, alkanol, butyl acetate and mixtures thereof.

6. The paste composition of claim 1, wherein the frit glass comprises lead.

7. The paste composition of claim 1, wherein the at least one functional particle alters a physical property of the frit glass.

8. The paste composition of claim 7, wherein the at least one functional particle raises the melting point of the frit glass.

9. The paste composition of claim 1, wherein the at least one functional particle is suitable to provide a desired electronic component.

10. The paste composition of claim 9, wherein the functional particle comprises a ruthenium-based resistor material, a dielectric capacitance material, or a ferromagnetic based inductor material.

11. The paste composition of claim 1, wherein the at least one functional particle is selected from the group consisting of a secondary particle, molecular precursor, and a frit glass modifier.

12. The paste composition of claim 1, wherein the conditions effective to provide a composite comprise a conventional processing method.

13. The paste composition of claim 1, wherein the conventional processing method is a sintering method.

14. The paste composition of claim 1, wherein the conditions effective to provide a composite comprise a laser processing method.

15. The paste composition of claim 2, wherein the at least one binder comprises at least one sol-gel precursor.

16. The paste composition of claim 15, wherein the at least one sol-gel precursor is a metal alkoxide.

* * * * *